US012637385B2

(12) United States Patent
Kikugawa et al.

(10) Patent No.: US 12,637,385 B2
(45) Date of Patent: May 26, 2026

(54) DECORATIVE COMPOSITION AND UTILIZATION THEREOF

(71) Applicant: NORITAKE CO., LIMITED, Nagoya (JP)

(72) Inventors: Yukiko Kikugawa, Miyoshi (JP); Yoshihide Maeno, Miyoshi (JP); Yoshihiro Suzuki, Miyoshi (JP)

(73) Assignee: Noritake Co., Limited (JP)

( * ) Notice: Subject to any disclaimer, the term of this patent is extended or adjusted under 35 U.S.C. 154(b) by 446 days.

(21) Appl. No.: 18/553,462

(22) PCT Filed: Mar. 14, 2022

(86) PCT No.: PCT/JP2022/011303
§ 371 (c)(1),
(2) Date: Sep. 29, 2023

(87) PCT Pub. No.: WO2022/209817
PCT Pub. Date: Oct. 6, 2022

(65) Prior Publication Data
US 2024/0101468 A1      Mar. 28, 2024

(30) Foreign Application Priority Data
Mar. 31, 2021    (JP) ................................. 2021-061345

(51) Int. Cl.
*C03C 8/18*          (2006.01)
(52) U.S. Cl.
CPC ............ *C03C 8/18* (2013.01); *C03C 2201/34* (2013.01); *C03C 2214/08* (2013.01)
(58) Field of Classification Search
CPC ...................................................... C03C 8/18
See application file for complete search history.

(56) References Cited

U.S. PATENT DOCUMENTS 6,428,880 B1      8/2002   Ito et al.

FOREIGN PATENT DOCUMENTS

| | | | |
|---|---|---|---|
| JP | S53099211 | A | 8/1978 |
| JP | S59069440 | A | 4/1984 |
| JP | H11006072 | A | 1/1999 |
| JP | H11335188 | A | 12/1999 |
| JP | 2000128675 | A | 5/2000 |
| JP | 2001130985 | A | 5/2001 |
| JP | 2002541056 | A | 12/2002 |
| JP | 4757434 | B | 8/2011 |
| JP | 2014518834 | A | 8/2014 |
| WO | 200061521 | A1 | 10/2000 |
| WO | 2012151228 | A1 | 11/2012 |

OTHER PUBLICATIONS

Shimohira et al., Research Report of National Institute for Research in Inorganic Material (vol. 42) 1985.
Preliminary Report on Patentability (PCT/IB/338), PCT/JP2022011303, 10/12/223.

*Primary Examiner* — Benjamin L Utech
(74) *Attorney, Agent, or Firm* — Gerald W. Roberts; John V. Daniluck; Dentons Bingham Greenebaum LLP

(57) ABSTRACT

The present disclosure provides a technology of obtaining a ceramic product including a decorative film which has a sufficient chemical resistance and can reduce damage during cleaning. A decorative composition disclosed herein contains at least a noble metal element and a glass matrix element. The glass matrix element contains a rare-earth element and a first element which is at least one selected from the group consisting of Si and Al. In the decorative composition disclosed herein, the content of the rare-earth element in the glass matrix element is from 1 mol % to 45 mol % inclusive, and the content of the first element in the glass matrix element is from 50 mol % to 90 mol % inclusive. This allows the decorative film having both alkali resistance and acid resistance at high level to be formed.

16 Claims, No Drawings

DECORATIVE COMPOSITION AND UTILIZATION THEREOF

CROSS REFERENCE TO RELATED APPLICATION(S)

The present application is a national stage filing of International Application No. PCT/JP2022/011303, filed Mar. 14, 2022, which claims the benefit of priority to Japanese Patent Application No. 2021-061345, filed Mar. 31, 2021, the entire disclosures of which are incorporated herein by reference.

TECHNICAL FIELD

The present invention relates to a decorative composition for use in decoration of ceramic products. Specifically, the present invention relates to a decorative composition containing a noble metal element and a glass matrix element. The present application is based upon and claims the benefit of priority from Japanese patent application No. 2021-061345 filed on Mar. 31, 2021, and the entire disclosure of which is incorporated herein its entirety by reference.

BACKGROUND ART

In order to provide elegant or gorgeous impression, a decorative film containing a noble metal is formed on the surface of a ceramic product such as pottery, glassware, and enamelware. This type of decorative film is formed by applying a decorative composition containing predetermined components to the surface of the ceramic product and then firing the decorative composition. Such a decorative composition can be, for example, a metal resinate (an organic compound of metal) containing a noble metal element and a glass matrix element. When such a decorative composition is fired, a decorative film containing a glass region and a noble metal is formed.

There are ceramic products (e.g., tableware) expected to be heated in microwave ovens. If a decorative film of a ceramic product contains a large amount of noble metal region, a decorative portion may be damaged by sparks caused by high-frequency electromagnetic waves (e.g., a frequency of about 2.45 GHz). For this reason, a microwave-compatible decorative composition having reduced content of the noble metal element has been proposed in recent years. Patent Literature 1 discloses an example of the microwave-compatible decorative composition. In the decorative composition (paste for overglaze) described in Patent Literature 1, the content of the noble metal component is controlled to be 20 wt % or more and less than 50 wt %, and noble metal regions dispersed in a dot pattern are dispersed on the surface of an insulating receptacle (ceramic product) after firing.

CITATION LIST

Patent Literature

Patent Literature 1: Japanese Patent No. 4757434

Patent Literature

Non-Patent Literature: "Study on Rare Earth Silicate Glass," Science and Technology Agency, Inorganic Material Laboratory, Vol. 42, Science and Technology Agency (1985)

SUMMARY OF INVENTION

Technical Problem

In recent years, it has been desired to develop a technology that can appropriately reduce damage (peeling, cracking, etc.) to decorative films when ceramic products are cleaned. Specifically, the glass region of the decorative film has poor chemical resistance and may be damaged when cleaned in a high-temperature environment using a strong alkaline detergent (e.g., an automatic dishwasher) or when immersed in an acid detergent for a long period of time. In particular, microwave-compatible ceramic products are even more prone to cause the damage to the decorative film during cleaning because the continuity of the noble metal region in the decorative film is lost and the glass region, which has poor chemical resistance, is more likely to be exposed.

The present invention was made in view of the circumstances and is intended to provide a technology for obtaining a ceramic product including a decorative film which has sufficient chemical resistance and can reduce damage during cleaning.

Solution to Problem

In order to solve the problems, the present inventors have considered that the glass region of the decorative film after firing is caused to contain a rare-earth element. Specifically, it is known that the presence of rare-earth element in a matrix of glass can improve alkali resistance of the glass (see Patent Literature 1). It is considered that the network structure of glass is tightened by doping the glass matrix with rare-earth element having high oxygen affinity, thereby reducing entering of alkali ions; thus the alkali resistance improvement effect is exhibited. It is also considered that the rare-earth oxide remains and forms a film after other components are exposed to the alkaline agent; thus an effect of reducing alkali erosion is also exhibited.

However, according to the study by the present inventors, the decorative film containing a rare-earth element in its glass region has improved alkali resistance but low acid resistance; thus the decorative film may be peeled off after immersion in an acidic detergent for a long period of time. As a result of repeated experiments and studies conducted by present inventors, it was found that in order to ensure practically sufficient acid resistance in the decorative film containing the rare-earth element in the glass region, the total content of silicon (Si) and aluminum (Al) needs to exceed a certain value. While not intended to limit the technology disclosed herein, the reasons for such an effect may be considered as follows. It is presumed that the acid resistance of the entire glass matrix is ensured by having acid-resistant (alumino)silicate glass as the main backbone. The technology disclosed herein is based on the findings. First, the technology disclosed herein provides a decorative composition which forms a decorative film on the surface of a ceramic product. The decorative composition contains at least a noble metal element and a glass matrix element. The glass matrix element contains a rare-earth element and a first element which is at least one selected from the group consisting of Si and Al. In the decorative composition disclosed herein, the content of the rare-earth element is from 1 mol % to 45 mol % inclusive, and the content of the first element is from 50 mol % to 90 mol % inclusive, when the total number of moles of the glass matrix element is 100 mol %.

Since the decorative composition with such a configuration contains a certain amount of rare-earth element, a decorative film including a glass region containing the rare-earth element can be formed. Since the decorative film containing the rare-earth element has excellent alkali resistance, the damage during cleaning with an alkaline detergent can be reduced. In addition, in the decorative composition, the content of the first element (Si, Al) is controlled to be 50 mol % or higher. This can sufficiently improve acid resistance of the decorative film after firing, thereby reducing the damage during cleaning with an acidic detergent. As can be seen from above, the decorative composition disclosed herein allows a ceramic product including a decorative film which has a sufficient chemical resistance and can reduce damage during cleaning to be provided.

In a preferred aspect of the decorative composition disclosed herein, a content of the noble metal element is from 25 mol % to 85 mol % inclusive when the total number of moles of the metal element and the metalloid element contained in the decorative composition is 100 mol %. As mentioned above, the decorative film formed from the decorative composition having a small content of the noble metal component has an advantageous of being less likely to be damaged when used in microwave ovens, but also has a problem of being easily damaged during cleaning due to the increase in amount of the glass region exposed. However, the technology disclosed herein improves the chemical resistance itself of the glass region, so that even if the amount of the glass region exposed increases, the damage to the decorative film can be suitably reduced. In other words, the technology disclosed herein is particularly preferably applicable to a microwave oven-compatible decorative composition.

In a preferred aspect of the decorative composition disclosed herein, the content of the first element is from 55 mol % to 86 mol % inclusive when the total number of moles of the glass matrix element is 100 mol %. This allows a decorative film having both alkali resistance and acid resistance at high level to be formed.

In a preferred aspect of the decorative composition disclosed herein, a content of the Al is from 0 mol % to 80 mol % inclusive when the total number of moles of the first element is 100 mol %. Al added makes the glass structure more rugged by interacting with the rare-earth element, thereby further increasing the alkali resistance. On the other hand, the Si has a role in formation of the glass backbone, and when the amount of the Si added is relatively low by addition of the Al, the glass backbone itself is weakened, thereby decreasing the chemical resistance. In light of this fact, it is preferred that the maximum content of the Al in the first element is 80 mol % or less to ensure the certain amount or more of the Si. This allows for formation of a decorative film with even more suitable chemical resistance. The inventor's experiments have confirmed that the decorative film having sufficient chemical resistance can be formed even when the content of the Al in the first element is 0 mol % (i.e., the first element is composed of only Si).

In a preferred aspect of the decorative composition disclosed herein, the glass matrix element further contains a second element which is at least one selected from the group consisting of Zr, Ti, and Co. This allows for formation of a decorative film with even further more suitable chemical resistance. In light of appropriately exhibiting a chemical resistance improvement effect by addition of the second element, the content of the second element is preferably from 1 mol % to 25 mol % inclusive when the total number of moles of the glass matrix element is 100 mol %.

In a preferred aspect of the secondary battery disclosed herein, the glass matrix element further contains Bi. This allows for formation of a decorative film with even more suitable chemical resistance. In light of appropriately exhibiting a chemical resistance improvement effect by addition of the Bi, the content of the Bi is preferably from 5 mol % to 15 mol % inclusive when the total number of moles of the glass matrix element is 100 mol %.

In a preferred aspect of the decorative composition disclosed herein, the noble metal element contains an element which is at least one selected from Au, Ag, Pt, Rh, Ir, and Pd. By using these elements as the noble metal element, a decorative film which provides elegant or gorgeous impression can be relatively easily formed.

DESCRIPTION OF EMBODIMENTS

The following describes suitable embodiments of the technology disclosed herein. The matters necessary for executing the technology disclosed herein, except for matters specifically herein referred to (e.g., the detailed preparing means of the decorative composition and production procedures of the ceramic product) can be grasped based on the technical contents taught herein and the common general technical knowledge of those skilled in the art in this art. The contents disclosed herein can be executed based on the contents disclosed herein and the technical knowledge in the present field. The expression "A to B" indicating herein a range means from A to B inclusive. Thus, the expression encompasses cases that are above A and below B.

1. Decorative Composition

The decorative composition disclosed herein will be described. The decorative composition contains at least a noble metal element and a glass matrix element. Each component will be described below (1) Noble Metal Element The noble metal element is a component which contributes to coloration of a fired body (i.e., a decorative film) of the decorative composition. Specifically, the decorative composition disclosed herein may contain, as the noble metal element, gold (Au), silver (Ag), platinum (Pt), rhodium (Rh), iridium (Ir), palladium (Pd), ruthenium (Ru), and osmium (Os). Among these precious metals, Au, Ag, Pt, Rh, Ir, and Pd are suitable from the viewpoint of relatively easy formation of a decorative film which provides elegant or gorgeous impression. The decorative composition may contain the noble metal element in the form of metal resinate (an organic compound of metal). The state of the noble metal element in the decorative composition is not limited to the metal resinate, and may be a complex or a polymer, or metal particles.

The content of the noble metal element in the decorative composition is preferably 85 mol % or less, more preferably 80 mol %, yet more preferably 70 mol % or less, still more preferably 60 mol % or less. The decorative film formed from the decorative composition having a small content of the noble metal component has an advantageous of being less likely to be damaged when used in microwave ovens, but also has a problem of being easily damaged during cleaning due to the increase in amount of the glass region exposed. However, according to the technology disclosed herein, even the decorative composition having a small content of such a noble metal component can suitably reduce damage to the decorative film. The lower limit of the content of the noble metal element is preferably 25 mol % or more, more preferably 30 mol % or more, yet more preferably 40 mol % or more, still more preferably 50 mol % or more. This allows for easy formation of a decorative film which provides elegant or gorgeous impression. The "component in the decorative composition" herein means the content (mol %) of a specific element when the total number of moles of metal elements and metalloid elements (i.e., B, Si, As, Te, At) contained in the decorative composition is 100 mol %.

(2) Glass Matrix Element

The "glass matrix element" herein is a concept that encompasses metal elements and metalloid elements which can constitute a matrix structure in a glass region of the decorative film after the firing. Examples of the glass matrix element include Al, Ti, Zr, Si, Bi, Sm, Y, La, Ce, Pr, Nd, Sm, Dy, Sn, Zn, Be, Mg, Ca, Sr, Ba, Li, Na, K, Rb, B, V, Fe, Cu, P, Sc, Pm, Eu, Gd, Tb, Ho, Er, Tm, Yb, Lu, Ni, In, Co, and Cr. Some of the noble metal elements (such as Ag) are oxidized and mixed into the glass matrix during the firing. However, for the sake of convenience, the elements listed in the item (1) Noble Metal Element are not considered as the glass matrix element herein. The "total number of moles of the glass matrix element" herein means the total number of moles of metal elements and metalloid elements which can constitute a matrix of the glass region excluding the noble metal element. Like the noble metal element, the form of the glass matrix element in the decorative composition is not particularly limited and can take forms of metal resinate, complex, polymer, fine particles (glass frit), and the like.

The decorative composition disclosed herein contains, as the glass matrix element, a rare-earth element and a first element which is at least one selected from the group consisting of Si and Al, and the contents of the rare-earth element and the first element are controlled to be in the predetermined ranges. This allows the decorative film having both alkali resistance and acid resistance at high level to be formed, thereby reducing damage to the decorative film during cleaning. The glass matrix element in the decorative composition disclosed herein will be described in detail below.

(a) Rare-Earth Element

The rare-earth element may be selected from scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu) without particular limitations. These rare-earth elements have high oxygen affinity. Thus when the glass matrix is doped with these rare-earth elements, the network structure of glass can be tightened. In addition, the rare earth oxide remains and forms a film after other components are eluted by exposure of the decorative film to the alkaline agent. This allows for reduction in damage to the decorative film due to entering of the glass region. Among rare-earth elements, Y, La, Ce, Pr, Nd, Sm, and Dy are suitable because they can appropriately improve alkali resistance of the glass region.

In light of sufficiently exhibiting the alkali resistance improvement effect by the rare-earth element, the content of the rare-earth element in the glass matrix element of the decorative composition disclosed herein is controlled to be 1 mol % or more. This allows for appropriate reduction in damage to the decorative film even when the decorative film is exposed to an environment in which it is immersed in a strong alkaline agent at high temperatures (e.g., automatic dishwashing). In light of further improving alkali resistance of the decorative film, the content of the rare-earth element in the glass matrix element is preferably 2 mol % or more, more preferably 3 mol % or more, yet more preferably 4.5 mol % or more, particularly preferably 5 mol % or more, for example, 5.5 mol % or more. On the other hand, the increase in the content of the rare-earth element may cause deterioration in acid resistance of the decorative film. Thus, in light of achieving both the alkali resistance and the acid resistance, the upper limit of the content of the rare-earth element in the decorative composition disclosed herein is determined to be 45 mol % or less. In light of suitably preventing deterioration in acid resistance, the upper limit of the content of the rare-earth element is preferably 42.5 mol % or less, more preferably 40 mol % or less, particularly preferably 37.5 mol % or less. The "content in the glass matrix element" herein means a content ratio (mol %) of a specific element when the total number of moles of the glass matrix element is 100 mol %.

(b) First Element

As mentioned above, the decorative composition disclosed herein contains silicon (Si) and (or) aluminum (Al), as a first element of the glass matrix element. First, Si becomes silicon oxide ($SiO_2$) after firing, which forms a backbone of glass matrix. Then, it is presumed that part of Al forms a composite oxide with another element (Si, a rare-earth element, a second element, or the like), thereby improving the chemical resistance of the glass matrix. According to experiments conducted by the present inventors, it was confirmed that in order to ensure practically sufficient acid resistance in the decorative film containing a glass region and a rare-earth element, the total content of silicon (Si) and aluminum (Al) needs to exceed a certain value.

In the decorative composition disclosed herein, the content of the first element in the glass matrix element (the total content of Si and Al) is controlled to be 50 mol % or more on the basis of the findings. This reduces the deterioration in acid resistance caused by addition of the rare-earth element and allows the decorative film having both the alkali resistance and the acid resistance at high level to be formed. In light of forming a decorative film having more suitable acid resistance, the content of the first element is preferably 52 mol % or more, more preferably 53 mol % or more, yet more preferably 54 mol % or more, particularly preferably 55 mol % or more. If the content of the first element is increased too much, the content of the rare-earth element relatively decreases, which makes it difficult to form a decorative film having a sufficient alkali resistance. In light of this fact, in the decorative composition disclosed herein, the upper limit of the content of the first element is determined to be 90 mol % or less. In light of forming a fired film having a suitable alkali resistance, the upper limit of the content of the first element is preferably 89 mol % or less, more preferably 88 mol % or less, yet more preferably 87 mol % or less, particularly preferably 86 mol % or less. When the total number of moles of the metal elements and the metalloid elements contained in the decorative composition is 100 mol %, the content of the first element is preferably from 14.5 mol % to 37 mol % inclusive, more preferably from 19 mol % to 35 mol % inclusive, particularly preferably from 20 mol % to 34 mol % inclusive.

When the total number of moles of the first element is 100 mol %, the content of Al (Al/(Si+Al)) is preferably 80 mol % or less, more preferably 75 mol % or less, yet more preferably 50 mol % or less, particularly preferably 10 mol % or less. When the content of Al is limited to a certain level or less to ensure the content of Si, a glass matrix having a strong backbone and excellent chemical resistance can be formed. In the first element of the decorative composition disclosed herein, Al is not an essential element. Even if the content of Al is 0 mol % (i.e., the first element is composed of only Si) when the total number of moles of the first element is 100 mol %, a decorative film having sufficient acid resistance can be formed when the total content of the first element in the glass matrix element is 50 mol % or more. However, the decorative composition containing, as the first element, both Si and Al can have higher alkali resistance. This is because Al added makes the glass structure more rugged by interacting with the rare-earth element. In light of this fact, the content of Al in the first element is preferably 0.01 mol % or more, more preferably 0.05 mol % or more, particularly preferably 0.1 mol % or more. When the total number of moles of the metal elements and metalloid elements contained in the decorative composition is 100 mol %, the content of Al is preferably from 0 mol % to 20 mol % inclusive, more preferably from 0.2 mol % to 18 mol % inclusive, yet more preferably from 0.2 mol % to 10 mol % inclusive, particularly preferably from 0.3 mol % to 4 mol % inclusive.

(c) Second Element

The decorative composition disclosed herein preferably contains the second element which is at least one selected from the group consisting of zirconium (Zr), titanium (Ti), and cobalt (Co). Oxides of these second elements have been found to further improve the chemical resistance of the decorative film after firing. While not intended to limit the technology disclosed herein, the reasons for such an effect may be considered as follows. First, Zr becomes zirconium oxide ($ZrO_2$) after firing, and Ti becomes titanium oxide ($TiO_2$) after firing. These $ZrO_2$ and $TiO_2$ are presumably complexed with the silicate glass backbone as glass network modifier ions. It is further expected that since each of $ZrO_2$ or $TiO_2$ as an independent material has really high chemical resistance, it remains and forms a film after other components are eluted by exposure of the decorative film to the alkaline agent, which contributes to improvement in chemical resistance of the decorative film after firing. On the other hand, Co becomes cobalt oxide (at least any of CoO, $Co_3O_4$, or $Co_2O_3$) after firing. The cobalt oxide is also presumed to be complexed with the glass backbone as glass network modifier ions. It is further expected that cobalt oxide improves adhesion between the noble metal and the glass matrix, which contributes to improvement in chemical resistance of the decorative film after firing.

The content of the second element in the glass matrix element is preferably 1 mol % or more, more preferably 2 mol % or more, yet more preferably 3 mol % or more, particularly preferably 4 mol % or more. This allows the chemical resistance improvement effect exhibited due to addition of the second element to be appropriately exhibited. If the content of the second element is increased too much, the contents of the rare-earth element and the first element relatively decrease, which may decrease the chemical resistance of the decorative film. In light of this fact, the upper limit of the content of the second element in the glass matrix element is preferably 25 mol % or less, more preferably 23 mol % or less, yet more preferably 22 mol % or less, particularly preferably 21 mol % or less. When the total number of moles of the metal elements and metalloid elements contained in the decorative composition is 100 mol %, the content of the second element is preferably from 0.1 mol % to 12 mol % inclusive, more preferably from 0.5 mol % to 11 mol % inclusive, yet more preferably from 1 mol % to 10.5 mol % inclusive, particularly preferably from 2 mol % to 10.5 mol % inclusive.

(d) Bismuth (Bi)

The glass matrix element of the decorative composition disclosed herein preferably contains bismuth (Bi). Bi becomes bismuth oxide ($Bi_2O_3$) after firing, which forms a backbone of glass matrix. $Bi_2O_3$ has an effect of softening glass, which improves adhesion, and when the base material is glass, it diffuses into the base material, resulting in a higher adhesion effect. The improvement in adhesion can reduce peeling off of the decorative film when the decorative film is exposed to an alkaline agent. In light of suitably exhibiting the effect caused by addition of Bi, the content of Bi in the glass matrix element is preferably 1 mol % or more, more preferably 3 mol % or more, yet more preferably 5 mol % or more, particularly preferably 6 mol % or more. If the content of Bi is increased too much, the contents of the rare-earth element and the first element relatively decrease, which may decrease the chemical resistance of the decorative film. In light of this fact, the upper limit of the content of Bi in the glass matrix element is preferably 15 mol % or less, more preferably 14 mol % or less, yet more preferably 13 mol % or less, particularly preferably 12 mol % or less.

If the content of Al which is one of the first elements mentioned above is increased too much, the alkali resistance of the decorative film may decrease. If it is necessary to form a decorative film containing such a large amount of Al, it is preferable to add a certain amount of Bi together. This can supplement alkali resistance reduced by the large amount of Al and maintain chemical resistance of the decorative film in the appropriate range. For example, when the content of Al in the glass matrix element is 50 mol % or higher (e.g., 70 mol % or higher), the content of Bi in the glass matrix element is preferably 10 mol % or higher. This allows for formation of a decorative film with even further more suitable chemical resistance.

The description is not intended to imply that the decorative composition disclosed herein contains Bi as an essential element. It has been confirmed in experiments that even if the decorative composition containing no Bi is used, a decorative film which has sufficient chemical resistance and can reduce damage thereto during cleaning can be formed.

(e) Other Elements

The decorative composition disclosed herein may further contain, as a glass matrix element, a metal element or metalloid element in the range in which the effect of the technology disclosed herein is not impaired, besides the elements. Examples of the other element include Sn, Zn, Be, Mg, Ca, Sr, Ba, Li, Na, K, Rb, B, V, Fe, Cu, P, Ni, and Cr. In light of the chemical resistance of the decorative film, the lower limit of the content of the other element in the glass matrix element is not particularly limited, but may be 0.1 mol % or more, 0.5 mol % or more, 1.0 mol % or more, 1.5 mol % or more. In light of preventing a relative reduction in content of active ingredients (the rare-earth element, the first element, and the like) which affects chemical resistance of the decorative film, the upper limit of the content of the other element is preferably 3.5 mol % or less, more preferably 3.0 mol % or less, yet more preferably 2.5 mol % or less, particularly preferably 2.0 mol % or less.

(3) Other Components

The noble metal element and the glass matrix element in the decorative composition disclosed herein have been described above. The decorative composition disclosed herein preferably further contains, besides the components described above, various components in consideration of fixation to the surface of the ceramic product and formability of the decorative film. Other components which may be contained in the decorative composition disclosed herein will be described below. As the other components described herein, components known to be used in the decorative composition can be used without particular limitations as long as they do not significantly interfere the effect of the technology disclosed herein. In other words, in the decorative composition disclosed herein, components other than essential components described above may be changed appropriately.

As mentioned above, the decorative composition disclosed herein may contain each of the noble metal element and the glass matrix element in a form of metal resinate. In such a case, the decorative composition contains an organic compound to form the metal resinate. Such an organic compound used can be any known resin material which can be used to generate a metal resinate without particular limitations. Examples of the resin material include: carboxylic acids having high carbon atoms (e.g., 8 or more carbon atoms) such as octanoic acid (2-ethylhexanoic acid), abietic acid, naphthenic acid, stearic acid, oleic acid, linolenic acid, and neodecanoic acid; sulfonic acid; resin acid contained in rosin or the like; resin balsam sulfides containing an essential oil component such as turpentine oil and lavender oil; alkyl mercaptide (alkyl thiolate); aryl mercaptide (aryl thiolate); mercaptocarboxylic acid ester, and alkoxide.

In the decorative composition containing the noble metal element and the glass matrix element which are each in the form of metal resinate, an organic solvent which disperses or dissolves the metal resinate is preferably used. As such a solvent, a solvent which has been used in a resinate paste and a solvent which has been used in a gold resinate solution can be used without particular limitations. Examples of the solvent include 1,4-dioxane, 1,8-cineole, 2-pyrrolidone, 2-phenyl ethanol, N-methyl-2-pyrrolidone, p-tolualdehyde, benzyl benzoate, butyl benzoate, eugenol, caprolactone, geraniol, methyl salicylate, cyclohexanone, cyclohexanol, cyclopentyl methyl ether, citronellal, di(2-chloroethyl)ether, diethylene glycol monomethyl ether, diethylene glycol monobutyl ether, dihydrocarvone, dibromomethane, dimethyl sulfoxide, dimethylformamide, nitrobenzene, pyrrolidone, propylene glycol monophenyl ether, pulegone, benzyl acetate, benzyl alcohol, benzaldehyde, turpentine oil, and lavender oil. These organic solvents may be used alone or in combination of two or more of them. Since the metal resinate is, for example, commercially available as a resinate paste, the resinate paste may be used as it is.

The content of the solvent is not particularly limited, and is preferably adjusted appropriately according to the means used to apply the decorative composition to the surface of the ceramic product. For example, when inkjet printing is used, the viscosity of the decorative composition is required to be controlled in a relatively low range (e.g., 70 mPa·s or less). Thus, in the decorative composition for inkjet printing, the content of the solvent is preferably controlled to be in the range of 50 wt % to 200 wt % when the total weight of the components other than the solvent is 100 wt %. When brushing method or screen printing is used, it is preferable to form a decorative composition with a sufficient thickness by a single application. Thus, it is preferable to control the content of the solvent to be in the range of about 10 wt % to about 80 wt % and prepare the decorative composition having a certain viscosity.

The decorative composition disclosed herein may contain another additional component as long as the effect of the technology disclosed herein is not significantly impaired. Examples of the additional component include an organic binder, a protective material, a surfactant, a thickener, a pH adjuster, a preservative, an antifoaming agent, a plasticizer, a stabilizer, and an antioxidant. When the additional component including the metal element and the metalloid element is used in the technology disclosed herein, the decorative composition needs to be prepared such that the content of the rare-earth element and the content of the first element become desired values in consideration of the content of elements derived from the additional component.

As mentioned above, the form of each of the noble metal element and the glass matrix element contained in the decorative composition disclosed herein is not limited to a metal resinate, and may be a complex, a polymer, or fine particles. When each of the noble metal element and the glass matrix element is in a form other than metal resinate, the forms of the solvent and the additional component are preferably changed appropriately according to the forms of the noble metal element and the glass matrix element. For example, when the noble metal element and the glass matrix element are caused to be contained in the forms in which they are not dissolved in a solvent, such as fine particles, it is preferable that a solvent in which the fine particles are appropriately dissolved is selected, and a dispersant or the like is added as the additional component.

2. Ceramic Product

The decorative composition disclosed herein is used to form a decorative film on the surface of a ceramic product. Such a decorative film is formed by applying the decorative composition to the surface of the ceramic product and then firing the decorative composition. The ceramic product can be, for example, one obtained by forming a glass film derived from a glaze on the surface of a ceramic substrate. For such a ceramic product, the decorative composition disclosed herein is used as a paint for "overglaze" to form a decorative film on the surface of the glass film. In the overglaze, the decorative composition may be applied to the surface of the glass film, which may then be fired at a temperature of about 700° C. to about 1000° C. Thus, the decorative film can be formed on the surface of the ceramic product. The decorative composition disclosed herein can also be used as a paint for "underglaze" to directly decorate the surface of unglazed fabric (ceramic base material). In the underglaze, the decorative composition may be applied to the surface of the ceramic base material, and is then fired at a temperature of about 1200° C. to about 1400° C. Thus, the decorative film can be formed on the surface of the ceramic product.

The decorative film in the ceramic product disclosed herein has a thickness of suitably from 30 mm to 250 nm inclusive. Aesthetics of such a ceramic product on which a thin decorative film has been formed may be significantly impaired even when the decorative film is slightly peeled off during cleaning. In contrast, the technology disclosed herein can improve chemical resistance of the decorative film and reduce peeling off of the decorative film during cleaning. Accordingly, the technology disclosed herein can be applied particularly suitably to production of ceramic products having the thin decorative film.

TEST EXAMPLES

Test examples regarding the technology disclosed herein will be described below. However, they are not intended that the technology disclosed herein is limited to such test examples.

[First Test]

1. Preparation of Samples

<Preparation of Decorative Composition>

In this test, 41 decorative compositions having different contents of a noble metal element and a glass matrix element were prepared (Examples 1 to 41). Table 1 shows the contents of each element in Examples 1 to 41. Each numerical value in Table 1 is a content (mol %) of each element when the total number of moles of the metal element and the metalloid element contained in the decorative composition is 100 mol %. In preparation of each decorative composition in this test example, various raw materials were mixed in an ointment jar and mixed for 2 minutes at a rotation speed of Y: Y resinate (yttrium resinate)
La: La resinate (lanthanum resinate)
Ce: Ce resinate (cerium resinate)
Pr: Pr resinate (praseodymium resinate)
Nd: Nd resinate (neodymium resinate)
Dy: Dy resinate (dysprosium resinate)

TABLE 1

| | Noble metal element | | | | | Rare-earth element | | | | | | | | Glass matrix element | | | | | | | |
| | | | | | | | | | | | | | | First element | | | Second element | | | | |
| Ex. | Ag | Au | Pt | Rh | total | Y | La | Ce | Pr | Nd | Sm | Dy | total | Si | Al | total | Ti | Zr | Co | total | Bi |
|---|---|---|---|---|---|---|---|---|---|---|---|---|---|---|---|---|---|---|---|---|---|
| Ex. 1 | | 3.6 | 69.5 | 0.8 | 73.9 | 2.5 | | | | | | | 2.5 | 19.9 | 1.6 | 21.6 | | | | | 2.1 |
| Ex. 2 | | 3.7 | 70.3 | 0.8 | 74.7 | 4.1 | | | | | | | 4.1 | 19.2 | 0.4 | 19.6 | | | | | 1.6 |
| Ex. 3 | | 3.6 | 68.2 | 7.8 | 79.6 | 4.0 | | | | | | | 4.0 | 10.8 | 3.7 | 14.5 | | | | | 1.9 |
| Ex. 4 | 1.0 | | 55.0 | 0.6 | 56.6 | 6.7 | | | | | | | 6.7 | 29.8 | 3.3 | 33.1 | | | | | 3.6 |
| Ex. 5 | | | 57.5 | 0.6 | 58.1 | 7.0 | | | | | | | 7.0 | 31.1 | | 31.1 | | | | | 3.8 |
| Ex. 6 | | | 55.6 | 0.6 | 56.2 | 6.8 | | | | | | | 6.8 | 30.1 | 3.3 | 33.4 | | | | | 3.6 |
| Ex. 7 | | | 57.3 | 0.6 | 57.9 | 7.0 | | | | | | | 7.0 | 31.0 | 0.3 | 31.4 | | | | | 3.8 |
| Ex. 8 | | | 57.3 | 0.6 | 57.9 | 7.0 | | | | | | | 7.0 | 31.1 | 0.3 | 31.3 | | | | | 3.8 |
| Ex. 9 | | | 56.5 | 0.6 | 57.1 | 6.9 | | | | | | | 6.9 | 30.6 | 1.7 | 32.3 | | | | | 3.7 |
| Ex. 10 | | | 67.3 | 0.7 | 68.0 | 5.3 | | | | | | | 5.3 | 23.5 | 0.3 | 23.8 | | | | | 2.9 |
| Ex. 11 | | | 63.1 | 0.7 | 63.8 | 12.8 | | | | | | | 12.8 | 19.0 | 2.1 | 21.0 | | | | | 2.3 |
| Ex. 12 | | | 57.3 | 0.6 | 57.9 | 15.7 | | | | | | | 15.7 | 23.3 | 0.3 | 23.5 | | | | | 2.8 |
| Ex. 13 | | | 64.4 | 0.7 | 65.1 | 13.1 | | | | | | | 13.1 | 19.3 | 0.2 | 19.5 | | | | | 2.3 |
| Ex. 14 | | | 56.7 | 0.6 | 57.3 | 16.0 | | | | | | | 16.0 | 23.6 | 0.2 | 23.8 | | | | | 2.9 |
| Ex. 15 | | 2.8 | 54.4 | 0.6 | 57.9 | 3.8 | | | | | | | 3.8 | 31.0 | 0.3 | 31.2 | | 3.5 | | 3.5 | 3.8 |
| Ex. 16 | | | 59.4 | 0.6 | 60.1 | 3.6 | | | | | | | 3.6 | 29.3 | 0.2 | 29.6 | | 3.2 | | 3.2 | 3.6 |
| Ex. 17 | | 2.9 | 55.4 | 0.6 | 58.9 | 1.9 | | | | | | | 1.9 | 30.4 | 0.3 | 30.7 | 1.5 | 3.3 | | 4.9 | 3.7 |
| Ex. 18 | | | 54.3 | 0.6 | 54.9 | 6.6 | | | | | | | 6.6 | 29.4 | 3.2 | 32.7 | | 2.2 | | 2.2 | 3.6 |
| Ex. 19 | | | 52.0 | 0.6 | 52.6 | 6.4 | | | | | | | 6.4 | 28.2 | 3.1 | 31.3 | 6.4 | | | 6.4 | 3.4 |
| Ex. 20 | | | 49.9 | 0.5 | 50.5 | 6.1 | | | | | | | 6.1 | 27.1 | 3.0 | 30.0 | 10.2 | | | 10.2 | 3.3 |
| Ex. 21 | | | 58.0 | 0.6 | 58.6 | | 2.7 | | | | | | 2.7 | 31.4 | 3.4 | 34.9 | | | | | 3.8 |
| Ex. 22 | | | 58.1 | 0.9 | 59.0 | | | 2.3 | | | | | 2.3 | 31.5 | 3.4 | 34.9 | | | | | 3.8 |
| Ex. 23 | | | 58.1 | 0.9 | 59.0 | | | | 2.2 | | | | 2.2 | 31.5 | 3.4 | 34.9 | | | | | 3.8 |
| Ex. 24 | | | 56.8 | 0.9 | 57.7 | | | | 4.4 | | | | 4.4 | 30.8 | 3.4 | 34.2 | | | | | 3.7 |
| Ex. 25 | | | 58.1 | 0.9 | 59.0 | | | | | 2.2 | | | 2.2 | 31.5 | 3.4 | 35.0 | | | | | 3.8 |
| Ex. 26 | | | 56.9 | 0.9 | 57.8 | | | | | 4.3 | | | 4.3 | 30.8 | 3.4 | 34.2 | | | | | 3.7 |
| Ex. 27 | | | 56.5 | 0.9 | 57.4 | | | | | 4.9 | | | 4.9 | 30.6 | 3.3 | 34.0 | | | | | 3.7 |
| Ex. 28 | | | 58.2 | 0.9 | 59.1 | | | | | | 2.1 | | 2.1 | 31.5 | 3.4 | 35.0 | | | | | 3.8 |
| Ex. 29 | | | 57.0 | 0.9 | 57.9 | | | | | | 4.1 | | 4.1 | 30.9 | 3.4 | 34.3 | | | | | 3.7 |
| Ex. 30 | | | 56.5 | 0.9 | 57.4 | | | | | | 4.9 | | 4.9 | 30.6 | 3.3 | 34.0 | | | | | 3.7 |
| Ex. 31 | | | 58.3 | 0.9 | 59.2 | | | | | | | 1.9 | 1.9 | 31.6 | 3.4 | 35.0 | | | | | 3.8 |
| Ex. 32 | | | 57.2 | 0.9 | 58.1 | | | | | | | 3.8 | 3.8 | 31.0 | 3.4 | 34.4 | | | | | 3.8 |
| Ex. 33 | | 13.3 | 53.7 | 0.7 | 67.8 | | | | | 3.3 | | | 3.3 | 7.4 | 17.7 | 25.1 | | | | | 3.8 |
| Ex. 34 | 54.2 | | 13.7 | 0.7 | 68.6 | | | | | 3.3 | | | 3.3 | 24.9 | 0.2 | 25.1 | | | | | 3.0 |
| Ex. 35 | 54.8 | | 13.8 | 0.8 | 69.3 | | | | | 3.9 | | | 3.9 | 23.9 | | 23.9 | | | | | 2.9 |
| Ex. 36 | 30.1 | | | 0.2 | 30.3 | 6.2 | | | | | | | 6.2 | 56.2 | 0.5 | 56.7 | | | | | 6.8 |
| Ex. 37 | | | 51.7 | 0.8 | 52.5 | | | | | 3.7 | | | 3.7 | 28.0 | 3.1 | 31.1 | | | 9.3 | 9.3 | 3.4 |
| Ex. 38 | | | 55.1 | 0.9 | 56.0 | | | | | 4.0 | | | 4.0 | 29.9 | 3.3 | 33.2 | | 3.3 | | 3.3 | 3.6 |
| Ex. 39 | | 0.8 | 26.0 | 1.0 | 27.8 | | | | | 1.9 | | | 1.9 | 52.8 | | 52.8 | 2.0 | | 12.9 | 14.9 | 2.6 |
| Ex. 40 | | | 59.6 | 0.6 | 60.3 | | | | | | | | 0.0 | 32.3 | 3.5 | 35.8 | | | | | 3.9 |
| Ex. 41 | | | 64.0 | 0.7 | 64.7 | 19.2 | | | | | | | 19.2 | 14.2 | 0.1 | 14.4 | | | | | 1.7 |

1800 rpm, using a mixer (product name: spinning and revolving AWATORI RENTARO) manufactured by Shinky Corporation.

The raw materials of each element contained in each decorative composition of this test example are as follows.

Ag: Ag resinate (silver resinate)
Au: Au resinate (gold resin balsam sulfide)
Pt: Pt resinate (platinum resin balsam sulfide)
Rh: Rh resinate (rhodium resin balsam sulfide)
Al: Al resinate (aluminum resinate) and aluminum complex
Ti: Ti resinate (titanium resinate) and titanium complex
Zr: Zr resinate (zirconium resinate) and zirconium complex
Co: Co resinate (cobalt resinate)
Si: Si resinate (silicon resinate)
Bi: Bi resinate (bismuth resinate)
Sm: Sm resinate (samarium resinate)

<Production of Ceramic Product>

A white porcelain flat plate (length: 15 mm, width: 15 mm) having a surface to which a glaze had been applied was prepared, and the decorative composition was then applied to the entire surface of one side of the white porcelain flat plate. For the application of the decorative composition, a spin coater Opticoat MS-A-150 available from MIKASA CO., LTD. with spin conditions set at 5000 rpm for 10 seconds was used. Then, the white porcelain flat plate with the decorative composition applied was dried on a hot plate set at 60° C. for 1 hour, and then fired at 800° C. for 10 minutes. Accordingly, the white porcelain flat plate having a decorative film formed on its surface was produced as a test piece of the ceramic product. Then, the cross section of the decorative film after firing was observed using FE-SEM (SU-8200, available from Hitachi High-Tech Corporation). The thickness of the decorative film after firing was in the range of 30 nm to 250 nm.

2. Evaluation Test

<Alkali Resistance Evaluation>

In this test, the test piece of each example was immersed, for 30 minutes, in a 0.5 wt % aqueous $Na_2CO_3$ solution which had been heated to 100° C. and boiled. Then, the test piece after the immersion was washed with water and subjected to a scratch test in which the test piece was rubbed with a zircon paper back and forth 10 times, and whether or not the decorative film was damaged was observed. In this test, the immersion time was extended in 30 minute increments, and the maximum immersion time at which 30% or more of the decorative film remained was regarded as the "endurance time (h)."

<Acid Resistance Evaluation>

A 4 wt % aqueous acetic acid solution was maintained at room temperature (23° C. to 25° C.), and each test piece was immersed in the aqueous acetic acid solution for 24 hours. Then, the test piece removed from the aqueous acetic acid solution was washed with water and subjected to a scratch test in which the test piece was rubbed with a zircon paper back and forth 10 times, and whether or not the decorative film was damaged was observed. In this test, a sample with 30% or more of the decorative film remaining was regarded as having sufficient acid resistance.

Table 2 shows results of each evaluation test in Examples 1 to 41. Table 2 also lists the "content of rare-earth element," the "content of first element," the "content of second element," and the "content of Bi." The contents are values (mol %) when the total number of moles of the glass matrix element is 100 mol %. Table 2 also lists the "content of Al relative to total number of moles of first element (Al/(Si+Al))."

TABLE 2

| Content (mol %) relative to 100 mol % of glass matrix element | | | | Al/(Si + Al) (mol %) | Alikali resistance evaluation (Endurance time (h)) | Acid resistance evaluation |
|---|---|---|---|---|---|---|
| Rare-earth element | First element | Second element | Bi | | | |
| Ex. 1 | 9.39 | 82.62 | 0.00 | 7.99 | 0.07 | 1.0 | ○ |
| Ex. 2 | 16.28 | 77.46 | 0.00 | 6.26 | 0.02 | 1.0 | ○ |
| Ex. 3 | 19.57 | 71.07 | 0.00 | 9.35 | 0.25 | 1.5 | ○ |
| Ex. 4 | 15.47 | 76.20 | 0.00 | 8.33 | 0.10 | 1.0 | ○ |
| Ex. 5 | 16.73 | 74.27 | 0.00 | 9.00 | 0.00 | 1.0 | ○ |
| Ex. 6 | 15.47 | 76.20 | 0.00 | 8.33 | 0.10 | 2.0 | ○ |
| Ex. 7 | 16.59 | 74.48 | 0.00 | 8.93 | 0.01 | 2.0 | ○ |
| Ex. 8 | 16.61 | 74.45 | 0.00 | 8.94 | 0.01 | 1.5 | ○ |
| Ex. 9 | 16.07 | 75.28 | 0.00 | 8.65 | 0.05 | 2.0 | ○ |
| Ex. 10 | 16.59 | 74.48 | 0.00 | 8.93 | 0.01 | 1.0 | ○ |
| Ex. 11 | 35.45 | 58.19 | 0.00 | 6.36 | 0.10 | 1.0 | ○ |
| Ex. 12 | 37.37 | 55.92 | 0.00 | 6.70 | 0.01 | 2.0 | ○ |
| Ex. 13 | 37.41 | 55.89 | 0.00 | 6.71 | 0.01 | 2.0 | ○ |
| Ex. 14 | 37.42 | 55.87 | 0.00 | 6.71 | 0.01 | 2.0 | ○ |
| Ex. 15 | 8.91 | 73.97 | 8.21 | 8.91 | 0.01 | 1.5 | ○ |
| Ex. 16 | 8.92 | 74.08 | 8.07 | 8.92 | 0.82 | 1.0 | ○ |
| Ex. 17 | 4.65 | 74.53 | 11.85 | 8.97 | 0.88 | 1.5 | ○ |
| Ex. 18 | 14.71 | 72.46 | 4.91 | 7.92 | 9.84 | 1,5 | ○ |
| Ex. 19 | 13.40 | 65.98 | 13.42 | 7.21 | 9.84 | 1.5 | ○ |
| Ex. 20 | 12.30 | 60.56 | 20.53 | 6.62 | 9.84 | 2.0 | ○ |
| Ex. 21 | 6.50 | 84.29 | 0.00 | 9.21 | 9.85 | 0.5 | ○ |
| Ex. 22 | 5.49 | 85.20 | 0.00 | 9.31 | 9.84 | 0.5 | ○ |
| Ex. 23 | 5.46 | 85.23 | 0.00 | 9.31 | 9.84 | 0.5 | ○ |
| Ex. 24 | 10.35 | 80.82 | 0.00 | 8.83 | 9.84 | 1.0 | ○ |
| Ex. 25 | 5.34 | 85.34 | 0.00 | 9.32 | 9.84 | 0.5 | ○ |
| Ex. 26 | 10.14 | 81.01 | 0.00 | 8.85 | 9.84 | 2.0 | ○ |
| Ex. 27 | 11.48 | 79.80 | 0.00 | 8.71 | 9.83 | 1.5 | ○ |
| Ex. 28 | 5.13 | 85.52 | 0.00 | 9.34 | 9.84 | 1.0 | ○ |

TABLE 2-continued

| Content (mol %) relative to 100 mol % of glass matrix element | | | | Al/(Si + Al) (mol %) | Alikali resistance evaluation (Endurance time (h)) | Acid resistance evaluation |
|---|---|---|---|---|---|---|
| Rare-earth element | First element | Second element | Bi | | | |
| Ex. 29 | 9.76 | 81.35 | 0.00 | 8.89 | 9.84 | 2.0 | ○ |
| Ex. 30 | 11.48 | 79.80 | 0.00 | 8.71 | 9.83 | 2.0 | ○ |
| Ex. 31 | 4.77 | 85.85 | 0.00 | 9.38 | 9.84 | 0.5 | ○ |
| Ex. 32 | 9.10 | 81.94 | 0.00 | 8.95 | 9.84 | 0.5 | ○ |
| Ex. 33 | 10.27 | 77.85 | 0.00 | 11.87 | 70.67 | 0.5 | ○ |
| Ex. 34 | 10.51 | 80.00 | 0.00 | 9.49 | 0.96 | 0.5 | ○ |
| Ex. 35 | 12.63 | 78.03 | 0.00 | 9.34 | 0.00 | 0.5 | ○ |
| Ex. 36 | 8.85 | 81.37 | 0.00 | 9.77 | 0.87 | 2.0 | ○ |
| Ex. 37 | 7.79 | 65.47 | 19.58 | 7.16 | 9.97 | 1.0 | ○ |
| Ex. 38 | 9.07 | 75.28 | 7.48 | 8.16 | 9.94 | 1.0 | ○ |
| Ex. 39 | 2.63 | 73.13 | 20.64 | 3.60 | 0.00 | 2.0 | ○ |
| Ex. 40 | 0.00 | 90.15 | 0.00 | 9.85 | 9.84 | x | ○ |
| Ex. 41 | 54.44 | 40.68 | 0.00 | 4.88 | 0.96 | 2.0 | x |

As summarized in Table 2, Examples 1 to 39 exhibited an endurance time of 30 minutes or longer in the alkali resistance evaluation, and reduced peeling of the decorative film in the acid resistance evaluation. In contrast, the decorative film formed using the decorative composition of Example 40 was peeled off within 30 minutes in the alkali resistance evaluation. As can be seen from comparison between Example 40 and Examples 1 to 39, in order to reduce peeling of the decorative composition in an alkaline agent, a certain amount of rare-earth element needs to be added to the decorative composition. The decorative film formed using the decorative composition of Example 41 was completely peeled in the acid resistance evaluation. As can be seen from comparison between Example 41 and Examples 1 to 39, in order to achieve both alkali resistance and acid resistance of the decorative film at high level, addition of only the rare-earth element to the decorative composition is insufficient and more than 50 mol % or more of the first element (Si, Al) needs to be added relative to the total amount of the glass matrix element.

[Second Test]

1. Preparation of Samples

<Preparation of Decorative Composition>

In this test, five decorative compositions having different contents of noble metal element and glass matrix element were prepared (Examples 42 to 46). Table 3 shows composition of the decorative composition of each example. In the preparation of the decorative compositions in this test, as in the first test described above, the various components were mixed in an ointment jar and mixed for 2 minutes at a rotation speed of 1800 rpm using a mixer (product name: spinning and revolving AWATORI RENTARO) manufactured by Shinky Corporation.

TABLE 3

| | Noble metal element | | | | | Glass matrix element | | | | | | | | | | | | | | | | |
| | | | | | | Rare-earth element | | | | | | | | First element | | | Second element | | | | | |
| | Ag | Au | Pt | Rh | total | Y | La | Ce | Pr | Nd | Sm | Dy | total | Si | Al | total | Ti | Zr | Co | total | Bi |
|---|---|---|---|---|---|---|---|---|---|---|---|---|---|---|---|---|---|---|---|---|---|
| Ex. 42 | | | 57.8 | 0.6 | 58.4 | | | | | | 7.1 | | 7.1 | 31.0 | 0.7 | 31.7 | 2.0 | | | 2.0 | 0.8 |
| Ex. 43 | | | 58.3 | 0.6 | 58.9 | | | | | | 7.1 | | 7.1 | 31.2 | 0.7 | 31.9 | 2.0 | | | 2.0 | |
| Ex. 44 | | | 55.5 | 1.7 | 57.2 | | | | | | 6.8 | | 6.8 | 29.7 | 0.7 | 30.4 | 1.9 | | | 1.9 | 3.7 |
| Ex. 45 | | | 56.5 | 1.8 | 58.3 | | | | | | 6.9 | | 6.9 | 30.3 | 0.7 | 31.0 | 2.0 | | | 2.0 | 1.9 |
| Ex. 46 | | | 57.2 | 1.8 | 58.9 | | | | | | 7.0 | | 7.0 | 30.6 | 0.7 | 31.3 | 2.0 | | | 2.0 | 0.8 |

<Production of Ceramic Product>

A white porcelain flat plate (length: 15 mm, width: 15 mm) having a surface to which a glaze had been applied was prepared, and the decorative composition was then applied to the entire surface of one side of the white porcelain flat plate. For the application of the decorative composition, a spin coater Opticoat MS-A-150 available from MIKASA CO., LTD. with spin conditions set at 5000 rpm for 10 seconds was used. Then, the white porcelain flat plate with the decorative composition applied was dried on a hot plate set at 60° C. for 1 hour, and then fired at 850° C. for 10 minutes. Accordingly, the white porcelain flat plate having a decorative film formed on its surface was produced as a test piece of the ceramic product. Then, the cross section of the decorative film after firing was observed using FE-SEM (SU-8200, available from Hitachi High-Tech Corporation). The thickness of the decorative film after firing was in the range of 30 nm to 250 nm.

2. Evaluation Test

In this test, the alkali resistance evaluation and the acid resistance evaluation were conducted under the same conditions as in the first test. In other words, in the alkali resistance evaluation, first, the test piece of each example was immersed, for 30 minutes, in a 0.5 wt % aqueous $Na_2CO_3$ solution which had been heated to 100° C. and boiled. Then, the test piece after the immersion was washed with water and subjected to a scratch test in which the test piece was rubbed with a zircon paper back and forth 10 times, and whether or not the decorative film was damaged was observed. The immersion time was extended in 30 minute increments, and the maximum immersion time at which 30% or more of the decorative film remained was regarded as the "endurance time (h)." Table 4 shows results of each evaluation test in Examples 42 to 46.

In the acid resistance evaluation, first, a 4 wt % aqueous acetic acid solution was maintained at room temperature (23° C. to 25° C.), and the test piece was immersed in the aqueous acetic acid solution for 24 hours. Then, the test piece removed from the aqueous acetic acid solution was washed with water and subjected to a scratch test in which the test piece was rubbed with a zircon paper back and forth 10 times, and whether or not the decorative film was damaged was observed. In this test, a sample with 30% or more of the decorative film remaining was regarded as having sufficient acid resistance. Table 4 shows results of each evaluation test in Examples 42 to 46.

TABLE 4

| | Content (mol %) relative to 100 mol % of glass matrix element | | | | Al/ (Si + Al) (mol %) | Alikali resistance evaluation (Endurance time (h)) | Acid resist- ance eval- uation |
| | Rare- earth element | First element | Second element | Bi | | | |
|---|---|---|---|---|---|---|---|
| Ex. 42 | 17.01 | 76.29 | 4.86 | 1.85 | 2.23 | 1.5 | ○ |
| Ex. 43 | 17.33 | 76.88 | 4.90 | 0.00 | 2.23 | 1.5 | ○ |
| Ex. 44 | 15.84 | 73.16 | 4.67 | 8.86 | 2.23 | 1.5 | ○ |
| Ex. 45 | 16.55 | 74.53 | 4.75 | 4.51 | 2.23 | 1.5 | ○ |
| Ex. 46 | 17.01 | 75.37 | 4.80 | 1.82 | 2.23 | 1.5 | ○ |

As can be seen from Table 4, in Examples 42 to 46, decorative films having excellent alkali resistance and acid resistance were formed. Accordingly, it was confirmed that even when the decorative composition containing no Bi is used such as in Example 43, a decorative film having sufficient chemical resistance (alkali resistance, acid resistance) can be formed.

Although specific examples of the technology disclosed herein have been described in detail above, they are mere examples and do not limit the appended claims. The technology described in the appended claims includes various modifications and changes of the foregoing specific examples.

The invention claimed is:

1. A decorative composition for forming a decorative film on a surface of a ceramic product, the decorative composition comprising:
   at least a noble metal element and a glass matrix element,
   the glass matrix element including:
   a rare-earth element; and
   a first element that is at least one selected from the group consisting of Si and Al,
   a content of the rare-earth element being from 1 mol % to 45 mol % inclusive when the total number of moles of the glass matrix element is 100 mol %,
   a content of the first element being from 50 mol % to 90 mol % inclusive when the total number of moles of the glass matrix element is 100 mol %.

2. The decorative composition according to claim 1, wherein
   a content of the noble metal element is from 25 mol % to 85 mol % inclusive when the total number of moles of a metal element and a metalloid element contained in the decorative composition is 100 mol %.

3. The decorative composition according to claim 2, wherein
   the content of the first element is from 55 mol % to 86 mol % inclusive when the total number of moles of the glass matrix element is 100 mol %.

4. The decorative composition according to claim 2, wherein

17 a content of the Al is from 0 mol % to 80 mol % inclusive when the total number of moles of the first element is 100 mol % inclusive.

5. The decorative composition according to claim 2, wherein the glass matrix element further contains a second element that is at least one selected from the group consisting of Zr, Ti, and Co.

6. The decorative composition according to claim 5, wherein a content of the second element is from 1 mol % to 25 mol % inclusive when the total number of moles of the glass matrix element is 100 mol %.

7. The decorative composition according to claim 2, wherein the glass matrix element further contains Bi.

8. The decorative composition according to claim 7, wherein a content of the Bi is from 5 mol % to 15 mol % inclusive when the total number of moles of the glass matrix element is 100 mol %.

9. The decorative composition according to claim 2, wherein the noble metal element contains at least one element selected from the group consisting of Au, Ag, Pt, Rh, Ir, and Pd.

10. The decorative composition according to claim 1, wherein the content of the first element is from 55 mol % to 86 mol % inclusive when the total number of moles of the glass matrix element is 100 mol %.

18

11. The decorative composition according to claim 1, wherein a content of the Al is from 0 mol % to 80 mol % inclusive when the total number of moles of the first element is 100 mol % inclusive.

12. The decorative composition according to claim 1, wherein the glass matrix element further contains a second element that is at least one selected from the group consisting of Zr, Ti, and Co.

13. The decorative composition according to claim 12, wherein a content of the second element is from 1 mol % to 25 mol % inclusive when the total number of moles of the glass matrix element is 100 mol %.

14. The decorative composition according to claim 1, wherein the glass matrix element further contains Bi.

15. The decorative composition according to claim 14, wherein a content of the Bi is from 5 mol % to 15 mol % inclusive when the total number of moles of the glass matrix element is 100 mol %.

16. The decorative composition according to claim 1, wherein the noble metal element contains at least one element selected from the group consisting of Au, Ag, Pt, Rh, Ir, and Pd.

\* \* \* \* \*